(12) United States Patent
Stark et al.

(10) Patent No.: US 11,173,454 B2
(45) Date of Patent: Nov. 16, 2021

(54) SELF-SUPPORTING MOF MEMBRANES

(71) Applicant: ETH Zurich, Zürich (CH)

(72) Inventors: Wendelin Jan Stark, Langenthal (CH); Samuel Hess, Zürich (CH)

(73) Assignee: ETH ZURICH

(*) Notice: Subject to any disclaimer, the term of this patent is extended or adjusted under 35 U.S.C. 154(b) by 339 days.

(21) Appl. No.: 16/305,627

(22) PCT Filed: May 26, 2017

(86) PCT No.: PCT/EP2017/062739
§ 371 (c)(1),
(2) Date: Nov. 29, 2018

(87) PCT Pub. No.: WO2017/207424
PCT Pub. Date: Dec. 7, 2017

(65) Prior Publication Data
US 2020/0306698 A1 Oct. 1, 2020

(30) Foreign Application Priority Data
May 31, 2016 (EP) .................... 16001222

(51) Int. Cl.
*B01D 67/00* (2006.01)
*B01D 69/14* (2006.01)

(52) U.S. Cl.
CPC ..... *B01D 67/0079* (2013.01); *B01D 67/0083* (2013.01); *B01D 69/148* (2013.01); *B01D 2325/20* (2013.01)

(58) Field of Classification Search
None
See application file for complete search history.

(56) References Cited

U.S. PATENT DOCUMENTS

| 2008/0296527 A1 | 12/2008 | Liu |
| 2015/0053080 A1 | 2/2015 | Boehringer |
| 2015/0367294 A1* | 12/2015 | Kharul ................ B01D 53/228 96/12 |

(Continued)

FOREIGN PATENT DOCUMENTS

| CN | 103585899 A | 2/2014 |
| CN | 104629080 A | 5/2015 |
| WO | 2017207424 A1 | 12/2017 |

OTHER PUBLICATIONS

International Search Report, date of completion of Jul. 19, 2017, European Patent Office, issued in International Application No. PCT/EP2017/062739.

(Continued)

*Primary Examiner* — Jason M Greene
(74) *Attorney, Agent, or Firm* — Benesch, Friedlander, Coplan & Aronoff LLP

(57) ABSTRACT

The present invention relates to the manufacturing of metal organic framework (MOF) containing composite materials, particularly membranes. The inventive process comprises the steps of a phase inversion polymer formation containing pores of precursor materials and in situ formation of MOFs. The invention further relates to new MOF containing membranes; to the use of such membranes in gas separation processes and to devices comprising such membranes.

16 Claims, 3 Drawing Sheets

(56) References Cited

U.S. PATENT DOCUMENTS

2019/0232251 A1* 8/2019 Dailly ............... B01D 67/0079

OTHER PUBLICATIONS

Falcaro, et al., "A new method to position and functionalize metal-organic framework crystals," Nature Communication, Mar. 15, 2011, vol. 2, 237, pp. 1-8.

Hou, et al., "Formation of Ultrathin, Continuous Metal-Organic Framework Membranes on Flexible Polymer Substrates," Angew. Chem. Int. Ed. 2016, 55, pp. 3947-3951.

Nagaraju, et al., "In situ growth of metal-organic frameworks on a porous ultrafiltration membrane for gas separation," Journal of Materials Chemistry A, May 16, 2013, vol. 1, No. 31, pp. 8828-8835.

Schwab, et al., "MOF@PolyHIPEs," Advanced Engineering Materials, 2008, Dec. 31, 2008, vol. 10, No. 12, pp. 1151-1155.

Sanchez, et al., "MOF thin films: existing and future applications," Chem. Soc. Rev., 2011, 40, pp. 1081-1106.

Stock, et al., "Synthesis of Metal-Organic Frameworks (MOFs): Routes to Various MOF Topologies, Morphologies, and Composites," American Chemical Society, Chemical Reviews, 2011, pp. 933-969.

Zhang, et al., "Challenges and Recent Advances in MOF-Polymer Composite Membranes for Gas Separation," Inorganic Chemistry Frontiers, 2016, pp. 1-14.

* cited by examiner

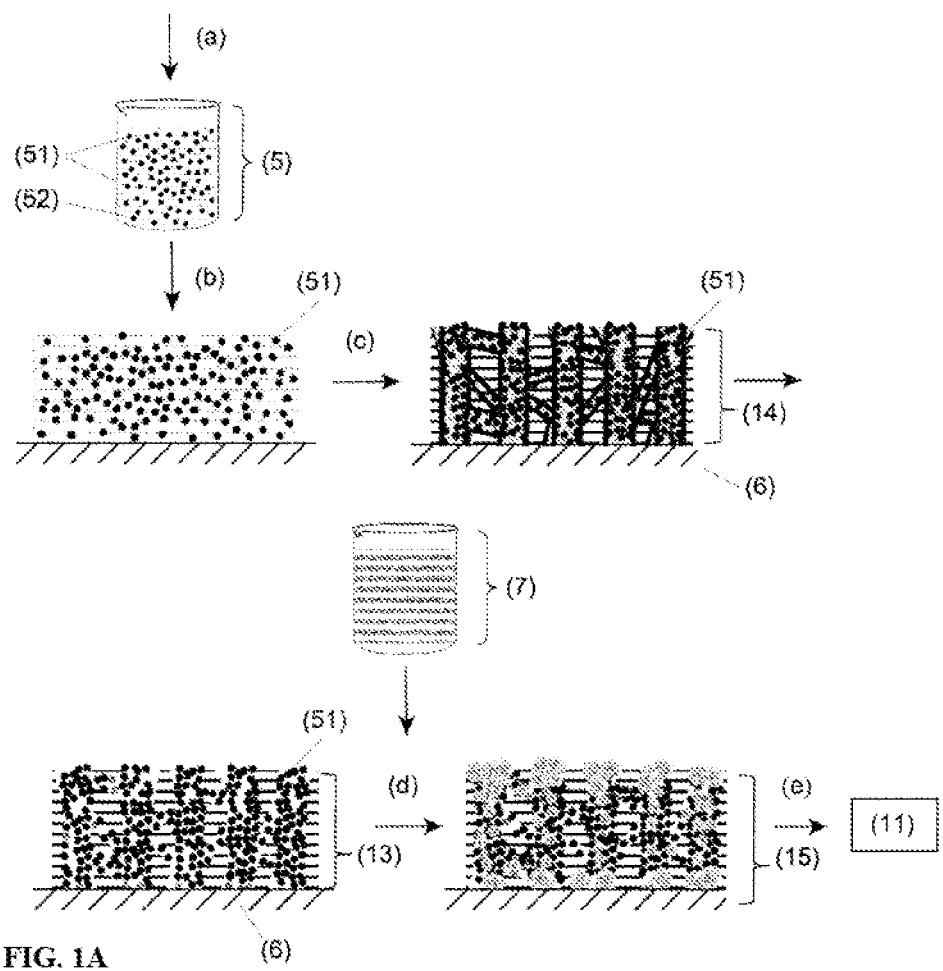
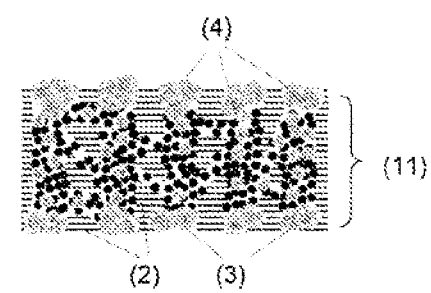
FIG. 1A
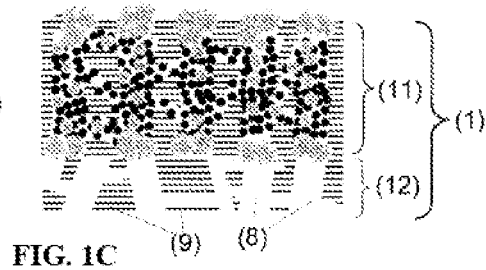
FIG. 1B
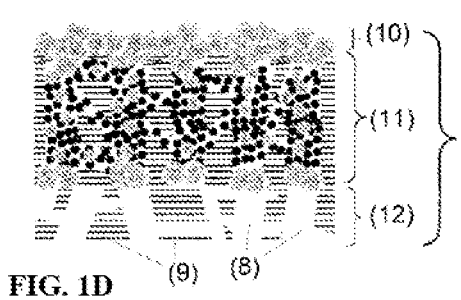
FIG. 1C
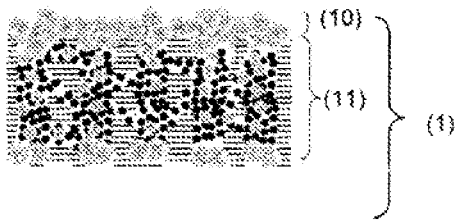
FIG. 1D
FIG. 1E
Fig. 1

SELF-SUPPORTING MOF MEMBRANES

BACKGROUND OF THE INVENTION

The present invention relates to the manufacturing of metal-organic framework (MOF) containing composite materials, particularly membranes. The inventive process comprises the steps of a phase inversion polymer formation containing pores of precursor materials and in situ formation of MOFs. The invention further relates to new MOF containing membranes; to the use of such membranes in various applications including gas separation, organic solvent nanofiltration, water treatment or chemical sensing processes, and to devices comprising such membranes.

MOFs, in the form of continuous, thin porous films, either supported on solid substrates or as free standing membranes, are generally known. It is well known that MOFs, such as zeolitic imidazolate frameworks (such as ZIF-8), have a wide variety of applications, including separation of gases.

Zhang et al (Inorganic Chem. Front. 2016) discuss challenges and recent advances in MOF—Polymer Composite membranes for gas separation. As outlined in chapter 3.4, stability of composite materials comprising homogeneously distributed MOF layers is insufficient, specifically as MOF layer may be shattered or detached from the substrates.

Hou et al (Angew. Chem. Int. Ed, 2016, 55, 3947) disclose formation of ultrathin continuous MOF membarnes on flexible polymer substrates. The authors address the above problem and suggest specific titania functionalized porous polymeric supports. Apparently, this is an complex and costly process.

Shekhah et al (Chem. Soc. Rev., 2011, 40, 1081 ff) critically review the present situation of MOF thin films, existing and future applications, with a focus on fabrication methods.

Stock et al (Chem. Rev., 2012, 112, 933) review the synthesis of MOFs, with a focus on routes to various MOF topologies, morphologies and composites.

Zhang et al (CN102794115) disclose a method of high-performance continuous ZIF-8 film formation for the high-performance separation and purification of gas. The authors claim the high-performance separation and purification of gases. As evidenced by the figures and the abstract, the ZIF-8 film is present as a separate layer on top of a substrate. Such layered structures between MOFs and polymer substrate are considered disadvantageous, particularly as they are brittle and thus of little mechanical stability.

King et al (WO2012/164395) disclose a method for manufacturing dense ZIF membranes on a porous support and their use in gas separation processes. These ZIF—membranes are obtained by either in-situ crystallisation or by seed growth, which is considered a disadvantageous process, not susceptible to large-scale manufacturing. Further, the membranes of King et al are not self-supporting but bound on a porous support.

Kharul et al (US2015/0367294 and J. Mater. Chem 2013, 1, 8828-35) disclose a process for the preparation of MOF-porous polymer membrane composites. In gas separation, these membranes show low selectivity towards hydrogen (vs. CO2 and vs. propene) typically in the range of 3-4. This selectivity is within the range expected by Knudsen diffusion, thereby indicating little or no influence of the MOF incorporated in the membrane disclosed therein.

In consequence, there is a need for improved membranes to separate gases as well as improved manufacturing methods obtaining same.

Thus, it is an object of the present invention to mitigate at least some of these drawbacks of the state of the art. In particular, it is an aim of the present invention to provide an improved method for manufacturing membranes. It is a further aim to provide improved membranes, particularly membranes for gas separation.

These objectives are achieved by the method as defined in claim 1 and by the membranes as defined in claim 9. Further aspects of the invention are disclosed in the specification and independent claims, preferred embodiments are disclosed in the specification and the dependent claims. Accordingly, the invention relates in a first aspect to a method for manufacturing composite materials (1), specifically in the form of a membrane;
in a second aspect to new composite materials, specifically in the form of a self-supporting membrane;
in a third aspect to the use of composite materials;
in a fourth aspect to devices comprising the composite materials.

The present invention will be described in more detail below. It is understood that the various embodiments, preferences and ranges as provided/disclosed in this specification may be combined at will. Further, depending of the specific embodiment, selected definitions, embodiments or ranges may not apply.

Unless otherwise stated, the following definitions shall apply in this specification:

As used herein, the term "a", "an", "the" and similar terms used in the context of the present invention (especially in the context of the claims) are to be construed to cover both the singular and plural unless otherwise indicated herein or clearly contradicted by the context.

As used herein, the terms "including", "containing" and "comprising" are used herein in their open, non-limiting sense.

Membrane: The term membrane is known in the field and denotes a devices that functions as a selective barrier due to the presence of pores. In the context of this invention, the polymer pore size of the membrane may cover a broad range, typically from 20 to 3000 nm, preferably from 100 to 500 nm. As used herein, a membrane is "self-supporting", if the membrane itself is free-standing and/or can be handled manually without a supporting structure. Such self-supporting membranes may contain one or more layers of polymeric material.

Metal-organic frameworks (MOFs): The term MOF is known in the field and denotes chemical entity comprising metal ions (including clusters) cores and ligands (also termed "struts"). The ligands have at least two coordination sites. In the context of this invention MOFs do form a 3 dimensional network with open pores.

BRIEF DESCRIPTION OF THE DRAWINGS

The present invention will be better understood by reference to the figures.

FIG. 1A is a schematic of an inventive method for manufacturing an inventive composite material as described herein.

FIG. 1B is a schematic of both an inventive composite material and an inventive membrane consisting of the composite material.

FIG. 1C is a schematic of both an inventive second composite material and an inventive membrane consisting of the second composite material.

FIG. 1D is a schematic of both an inventive third composite material and an inventive membrane consisting of the third composite material.

FIG. 1E is a schematic of both an inventive fourth composite material and an inventive membrane consisting of the fourth composite material.

DETAILED DESCRIPTION OF THE INVENTION

Figure 2:
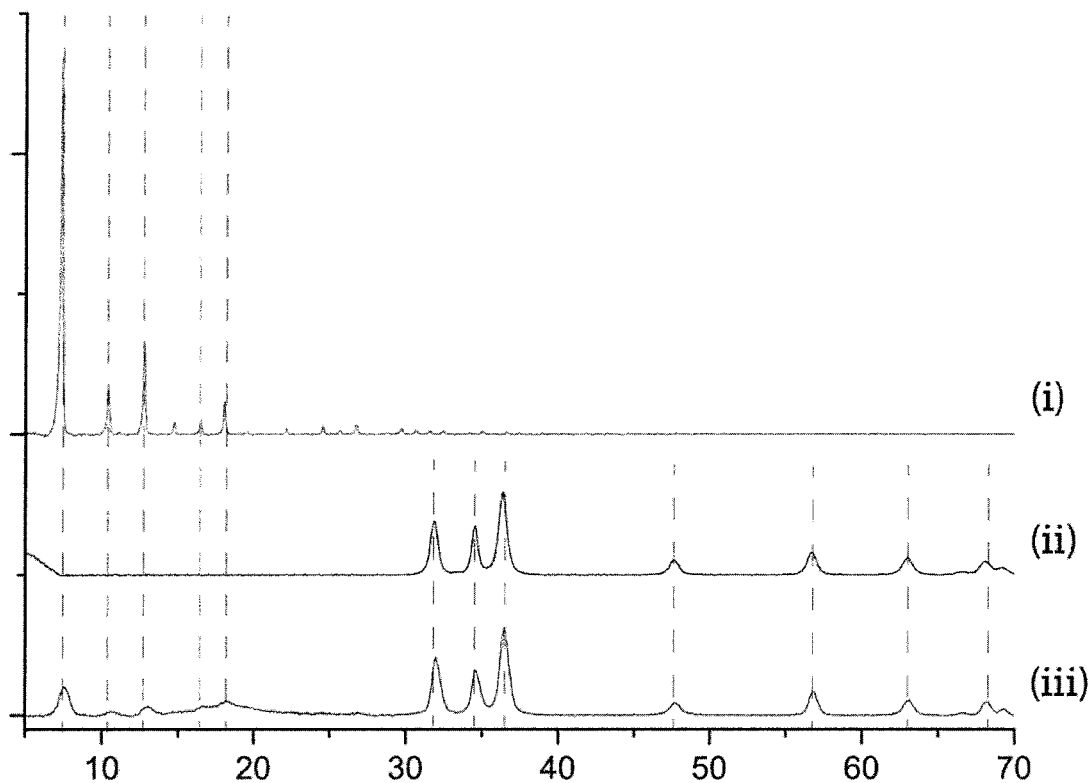
FIG. 2 depicts an X-ray diffraction (XRD) analysis for (i) ZIF-8 (Basolite Z1200), (ii) ZnO particles; and (iii) an inventive composite material as described herein.

FIG. 1 outlines the invention as described herein.

The reaction steps (a) to (e), as described in the specification, are indicated.

(11) represents the composite material of this invention, typically in the form of a self-supporting and flexible membrane.

(2) represents the polymer matrix as described herein.

(3) represents metal-organic frameworks (MOFs). As described herein, said MOFs (3) being embedded in said polymer matrix (2) in channel-like structures (4) and thus form a discontinuous phase. Optionally said MOFs form an additional top layer (10) in the form of a continuous phase.

(4) represents channel-like structures in polymer matrix (2).

(5) represents the starting material, a dispersion as described herein containing a dispersed phase (51) and a continuous phase (52).

(6) represents a substrate, acting as a supporting material during manufacturing.

(7) represent the synthesis solution as described herein, comprising ligand, solvent and optionally further additives.

(8) represents pores in said material (9), said pores having at least the same diameter as the channel-like structures (4)

(9) represents a solid polymer or an inorganic material having pores (8) as described herein.

(10) represents a continuous layer of MOFs on top of (11)

(12) represents a second porous material comprising a polymer or an inorganic material (9) and pores/channel like structures (8).

(13) represents a second precursor material containing a polymer matrix devoid of non-solvent, and seeds in the pores of said matrix.

(14) represents a precursor material containing a polymer matrix and embedded therein metal/metal oxide nanoparticles ("seeds") and non-solvent. As MOFs are not yet formed, this material (14) is considered a precursor for the inventive composite (11).

(15) represents the inventive composite material (11), containing a polymer matrix (2) and pores filled with MOFs (3), located on substrate (6).

FIG. 1A: outlines the inventive method for manufacturing the composite materials; reaction steps (a) to (e), as described in the specification, are indicated FIGS. 1B, 1C, 1D and 1E schematically show four embodiments of the inventive material (composites and membranes) as described herein.

FIG. 1B illustrates both, the inventive composite material (11) and an inventive membrane (1) consisting of the composite material (11).

FIG. 1C illustrates both, the inventive second composite and an inventive membrane (1) consisting of a second composite material. Said second composite consists of composite material (11) and a second porous material (12).

FIG. 1D illustrates both, an inventive third composite and an inventive membrane (1) consisting of said third composite. Said third composite consists of composite material (11), a second porous material (12) on one side of composite (11) and a continuous MOF layer (10) on the opposite site of composite (11).

FIG. 1E illustrates both, an inventive fourth composite and an inventive membrane (1) consisting of said fourth composite. Said fourth composite consists of composite material (11) and a continuous MOF layer (10).

FIG. 2: XRD spectrum of (i) ZIF-8 (Basolite Z1200), (ii) ZnO particles; (iii) inventive composite material; x-axis 2 Theta, y-axis intensity (a.u.).

Figure 3:
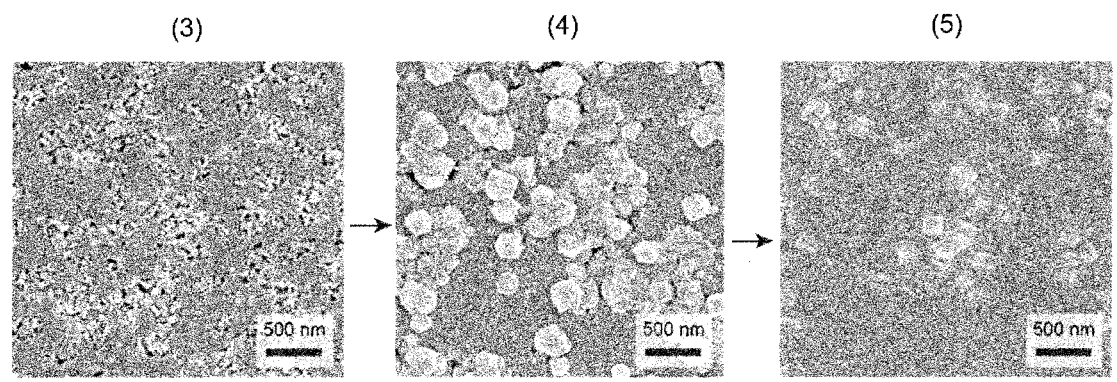
FIG. 3 shows SEM images of a composite membrane during different production steps.

FIG. 3: SEM images of composite membrane during different production steps:

(3) PES membrane containing pore directed ZnO particles (4) PES membrane containing pore directed ZIF-8 crystals (5) PES membrane containing pore directed, well embedded ZIF-8 crystals.

Figure 4:
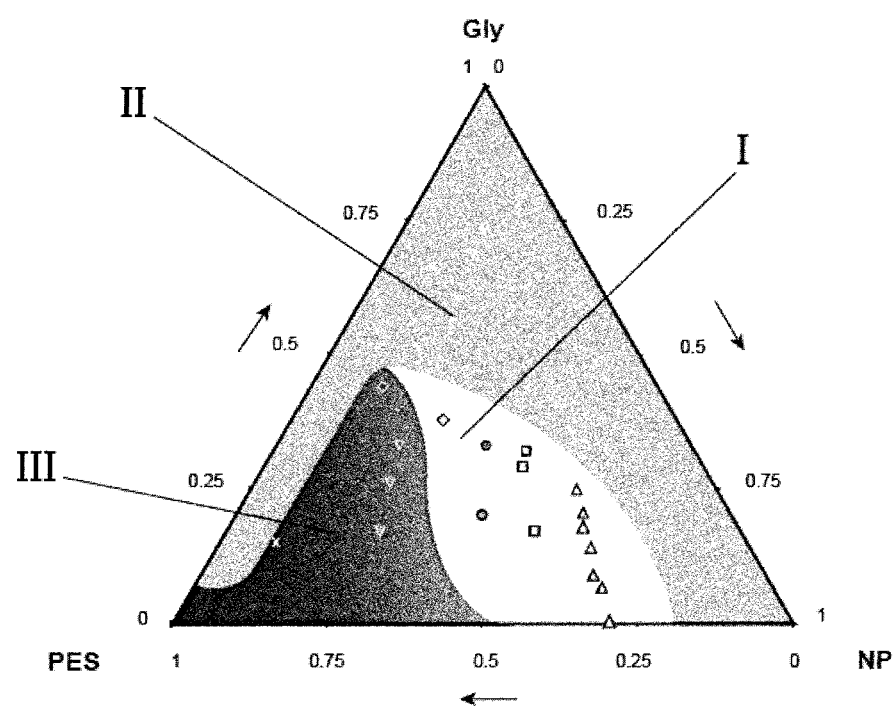
FIG. 4 is a diagram describing the membrane morphologies resulting out of different compositions of polymer (PES), glycerol (GLY) and ZnO nanoparticles (NP).

FIG. 4: Three component diagram describing the membrane morphologies resulting out of different compositions of polymer (PES), glycerol (GLY) and ZnO nanoparticles (NP). Area (I) indicates bi-continuous structure with stable water flux; area (II) indicates no proper membrane formation; area (III) indicates droplet like structures with no water flux. It is understood that this specific example illustrates the concept, but will differ for other starting materials and varying synthesis conditions.

In more general terms, in a first aspect, the invention relates to a method of manufacturing composite materials (11), specifically membranes (1), said composite material comprising a polymer matrix (2) and metal-organic frameworks (MOFs) (3), said MOFs (3) being embedded in said polymer matrix (2) in channel-like structures (4). This aspect of the invention shall be explained in further details below.

Broadly speaking, the invention provides a method for manufacturing a composite material (11) as described above; said method comprising the step of providing a precursor material (14) on a substrate (6), said precursor material (14) comprising a polymer matrix (2) and nanoparticles (51), said nanoparticles being embedded in said polymer matrix (2) in channel-like structures (4), and said nanoparticles being selected from the group consisting of metal oxides, metals, metal salts, and metal silicates; and the step of contacting said precursor material (14) with a solution (7), said solution comprising a solvent, ligand and optionally additives to thereby obtain a second precursor material (15). The precursor material (14) is known and e.g. available by a templated-assisted phase inversion process as described in Hess et al. (ACS Applied materials & interfaces, 2015, 7, 611 ff). Contrary to the method of Hess et al, the nanoparticles are not removed by dissolution, but retained in the pores and subject to in situ MOF formation via reaction with ligand. Reaction solution (7) and suitable reaction conditions to allow for in situ MOF formation are described in more detail below, step (d). The second precursor material (15) comprises, as indicated in FIG. 1, the composite material (11) located on substrate (6).

The inventive method allows to stabilize MOFs for commercial applications while at the same time retaining their chemical and physical properties. This method combines the formation step of a polymeric porous support and a directed nanoparticle seeding step. So far, seeding techniques as well as non-seeding techniques based MOF synthesis strategies did not allow such simple and precise directing of the MOF growth, especially within the membrane's pores. Previous attempts to make MOFs available for commercial applications either resulted in materials not suitable for applications outside the laboratory environment, or in materials where the unique properties of MOFs are essentially lost.

The invention thus relates in one embodiment to the manufacturing composite materials in the form of a membrane, the inventive method may be summarized as follows: First (a), a dispersion containing a polymer, a solvent, a non-solvent, and nanoparticles is provided (typically by using an ultrasonic processor). Second (b, c), a thin film is casted on a substrate (typically a glass plate, an aluminium or polymer film). In order to remove the solvent and to effect phase inversion, the membrane is dried (typically in an oven). Thereafter, the membrane is washed (typically in water) and dried (typically in an oven). Third (d), the membrane is incubated within a synthesis solution to obtain MOFs in the pores of the membrane, again followed by washing and drying (typically in an oven). Fourth (e), optionally, post synthesis step(s) is/are performed. If pinholes are still present at the polymer-MOF interface, a sealing step may be performed. Therefore, the membrane is incubated in a solvent atmosphere. Further, the obtained membrane may be combined with additional polymer supporting layers (typically by applying layer by layer solvent casting steps).

The invention relates in one further embodiment to the manufacturing of a composite material; said composite material comprising a polymer matrix with channel-like structures and metal-organic frameworks (MOFs) embedded in said channels; said method comprises the steps of: (a) providing a dispersion comprising a first solvent preferably as outlined below, a second solvent (a "non-solvent"), different from the first solvent, preferably as outlined below, a polymer preferably as outlined below, nanoparticles preferably as outlined below; (b) coating a substrate with said dispersion; (c) subjecting the obtained material to a phase inversion step to obtain a polymer matrix with channel-like structures; (d) contacting the obtained material with a solution comprising a third solvent ("diluent") preferably as outlined below and a ligand preferably as outlined below, to obtain a broad variety of MOFs; (e) optionally removing the obtained composite material from said support and/or further processing the obtained composite material.

Composite material (11): The inventive manufacturing method provides composite materials of a particular structure, as shown in the figures, particularly FIGS. 1B, 1C and 1D and 1E. These composite materials comprise a polymer matrix and MOFs embedded therein. Particularly, said polymer matrix comprises channel-like structures (4). These structures are obtainable during manufacturing by phase inversion. The term "channel-like structures" is well established in the field and discussed e.g. in Hou et al. (Adcanved materials 2016, 28 (33), 7049-7064). As used herein, the term particularly relates to composites where the pore depth is greatly larger than the pores size, e.g. such as 10:1 or more. It is further apparent, that the channel-like structure, which is often idealized as cylindrical, mostly is random and uneven shaped, and of different size. Channels in the composite material (11) may range from 50-10000 nm, preferably from 100-1000 nm.

Further, said MOFs are embedded in said channel-like structures. According to this invention, the MOFs and optionally remaining seeding particles are embedded in the polymer due to the in situ synthesis. This location of the MOFs inside the polymer distinguishes the composite material from the known materials, where MOFs are located as a separate layer on a polymer matrix. This specific structure of the inventive composite material allows for the applications identified below ($3^{rd}$ aspect) and ensures a mechanically stable composite material, avoiding the MOFs being shattered or detached from the support, as discussed in the prior art.

In one embodiment, the invention provides for manufacturing a composite material (11), said composite material containing, particularly consisting of, polymer matrix (2) and MOFs (3), said MOFs (3) being embedded in said polymer matrix (2) in channel-like structures (4). Such composite materials (11) being shown in FIG. 1B.

In one further embodiment, the invention provides for manufacturing of a second composite material, said composite containing (i.e. comprising or consisting of) said first layer of material (11) and a second layer (12) of organic or inorganic material (9) having pores (8). This second layer (12) may be considered a supporting layer improving the stability of the composite material (1). Advantageously, said pores (8) are free of, or essentially free of solid material. Such second composite materials are typically present in the form of a membrane and are depicted in FIG. 1C.

In one further embodiment, the invention provides for manufacturing of a third composite material, said composite containing said first layer of material (11), said second layer (12) and a third layer (10), said third layer (10) being opposite to layer (12) and said third layer (10) comprises a closed film of MOFs. This third layer may be considered a functional layer further increasing the performance of the composite material. Such third composite materials are typically present in the form of a membrane and are depicted in FIG. 1D.

In one further embodiment, the invention provides for manufacturing of a fourth composite material, said composite containing, particularly consisting of, said first layer of material (11), and said third layer (10). Such fourth composite materials are typically present in the form of a membrane and are in FIG. 1E.

In an advantageous embodiment, the inventive method provides composite materials (11) or second, third, or fourth composite materials in the form of a membrane (1). Advantageously, the channel-like structures (4) are predominantly perpendicular to the membrane's surface.

The inventive composite materials/membranes are discussed in further detail below, second aspect of the invention.

Manufacturing steps, overview: The method steps (a), (b), (c) are known and described in Hess et al. (ACS Applied materials & interfaces, 2015, 7, 611 ff). Hess et al. apply the concept of template assisted phase—inversion for pore formation in polymer membranes. The authors discuss the influence of various reaction parameters on pore formation. The obtained membranes contain polymer and "empty" pores with pore diameters ranging from sub-20 nm up to 100 nm. Accordingly, the membranes of Hess et al are suitable for water filtration, but are not suited for separation of gases.

Each of steps (b), (c), (d) and (e) may be complemented by washing and/or drying steps, as they are conventional in the field.

Step (a), provision of dispersion: The starting materials used for preparing a dispersion are commercial items, or obtainable according to known methods. Manufacturing of a dispersion using these starting materials is known. To ensure nanoparticles (dispersed phase) are properly dispersed within the continuous phase, standard process steps, such as sonication, may be performed.

Continuous phase: Advantageously, polymer, solvent and non-solvent ("second solvent") form a homogenous phase. In view of step (c), phase inversion, the starting materials have to be chosen appropriately. Suitable combinations and amounts of these three components are known to the skilled person or may be determined by routine experiments.

Suitable polymers include celluloseacetate (CA), polyethersulfone (PES), polyvinylidenfluoride (PVDF), polysulfone (PSf), polyacrylonitrile (PAN), polyamide (PA), polyimide (PI), polyamide-imide (PAI, e.g., TORLON), polyetheretherketones (PEEK) and polylactic acid (PLA), polycarbonates (PC), polystyrenes (PS), polyacrylates, and polyurethanes (PU).

Suitable solvents include dimethylacetamide (DMAc), N-methyl pyrrolidone (NMP), tetramethylurea (TMU), dimethyl-formamide (DMF), dichlormethane, pentafluorophenol.

Suitable first solvents include alcohols, ethers, ketones, esters, lactones, halogenalkanes, alkanes, cycloalkanes, sulfoxides, amides, lactames, pyrrolidones and combinations thereof.

Suitable second solvents ("non-solvents") include water, C1-C8 mono-alcohols (e.g. MeOH, EtOH, OcOH), C2-C4 diols and triols (e.g. glycerol), polyols (e.g. polyethylene glycol), C5-C12 alkanes (e.g. hexane) and combinations thereof.

Dispersed phase: For manufacturing the inventive membrane, suitable nanoparticles may form MOFs upon contact with the appropriate ligand. Such nanoparticles include metals, metal oxides, metal salts and metal silicates. For manufacturing zinc-based MOFs, ZnO was found a suitable starting material For manufacturing a porous material, free of MOFs, soluble nanoparticles selected from the group of metals, metal oxides and metal salts may be used. Such second metal particles are soluble under conditions where said first nanoparticles do not dissolve. Particularly suitable second nanoparticles are selected from the group consisting of metal carbonates and metal halogenides.

Suitable combinations for dispersions according to step (a) are outlined below. As general rule, suitable polymers are soluble (or easily dispersible) in the chosen solvent. Further the solvent and non-solvent, which does not solve the chosen polymer, are miscible. There are usually several solvents that are compatible with a given polymer. Water and aliphatic alcohols are examples of suitable non-solvents. Preferably, the non-solvents boiling point is higher than the one of the solvent.

Advantageously, the particles' wettability by the polymer-solvent does not exceed their wettability by non-solvent phase.

| continuous phase | | | disp. phase | optional. disp. phase |
|---|---|---|---|---|
| Polymer | Solvent | Non-solvent | Particles | Particles |
| CA | DMAc, NMP | glycerol, PEG, octanol, water | ZnO | CaCO$_3$, ZnO, NaCl, NaCO$_3$ |
| PES | DMAc, NMP, TMU, DMF | glycerol, PEG, octanol, water | ZnO | CaCO$_3$, NaCO$_3$, NaCl, zeolite 4A, copper NPs, iron NPs, silver NPs |

-continued

| continuous phase | | | disp. phase | optional. disp. phase |
|---|---|---|---|---|
| Polymer | Solvent | Non-solvent | Particles | Particles |
| PVDF | DMAc, DMF, NMP, TEP | PEG, glycerol, octanol, water | ZnO | CaCO$_3$, NaCO$_3$, NaCl |
| PSf | DMF | glycerol, PEG, water | ZnO | CaCO$_3$, NaCO$_3$, NaCl |
| PLA | CH2CL2 | hexane, water | ZnO | CaCO$_3$, NaCO$_3$ |
| PAN | NMP, DMAc, DMF | PEG, glycerol, water | ZnO | CaCO$_3$, NaCO$_3$ |
| PI | NMP, DMF, DMAc | PEG, glycerol, octanol, water | ZnO | CaCO$_3$, NaCO$_3$ |
| PAI | NMP, DMAc, DMF | PEG, glycerol, water | ZnO | CaCO$_3$, NaCO$_3$ |

Abbreviations:
NPs = nanoparticles

Step (b), coating: In this step, a coated substrate is obtained. Any method suitable for coating a dispersion on a substrate may be employed.

Substrate: In one embodiment, a conventional, uncoated substrate is provided. Coating such substrate with the dispersion of step (a) results in a thin, mono-layered film.

In an alternative embodiment, a coated substrate is provided. Such coated substrate may comprise a conventional uncoated substrate and a first coating. Said first coating may be a porous polymer layer. In an advantageous embodiment, said porous polymer layer comprises the same polymer as the dispersion of step (a) and is obtained via phase inversion.

Step (c), phase inversion: In this step, pores are formed in the polymer matrix by a phase-inversion process. The phase-inversion process is well-known and widely used for manufacturing porous membranes, as discussed in Solomon et al (Sci. Rep., 2014, 5504), which is incorporated by reference. Without being bound to theory, it is believed that the process is more a particle stabilized solvent evaporation induced phase separation, than the classical coagulation bath induced phase inversion. The polymer precipitates upon solvent evaporation and reaching a critical solvent-non-solvent-polymer concentration. Simultaneously, upon phase separation, the nanoparticles (51) are directed into the thus formed pores channel-like structures (4). Without being bound to theory, it is believed that this unexpected effect is of great importance for successfully performing the inventive method.

In an alternative embodiment, particularly were dispersed nanoparticles already form a continuous structure leading to suitably sized pores, the usage of non-solvents might be obsolete.

Step (d), MOF synthesis: As discussed above, MOF synthesis is performed in situ. To this end, suitable amounts of ligand are brought into contact with the nanoparticles embedded in the channel-like structures of the polymer matrix. It is believed that immobilized nanoparticles allow a robust scalable directed synthesis of MOFs, contrary to known MOF-membrane strategies like liquid-liquid interfacial synthesis, also called "counter-diffusion technique" Without being bound to theory; it is believed this step is a key feature of the inventive method. It allows the synthesis of MOFs within the pores of the polymer, thereby directing the MOFs to the positions where they are required and simultaneously stabilizing the MOFs. Advantageously, the material obtained in step (c) is contacted with a synthesis solution comprising ligands (7). Suitable synthesis solutions comprise a diluent (third solvent), ligand and optionally additives and are further outlined below. Suitable reaction conditions may vary over a broad range and include temperatures between 10-150° C.; reaction times between 0.1-24 h.

Advantageously, this step is complemented by a washing step (e.g. using MeOH) and/or a drying step at elevated temperatures (e.g. @ 60° C.)

Advantageously, the ligand:solvent ratio ranges from 0.1: 99.9 to 20:80, preferably from 1:99 to 20:80 (by weight).

Diluent: Suitable diluents may be selected according to the ligand and include water, C1-C8 mono-alcohols, such as MeOH, EtOH, n-PrOH, iPrOH, n-BuOH, n-OcOH, hexane, toluene, tetrahydrofuran (THF), dimethylacetamide (DMAc) and di-methylformamide (DMF). Preferred diluents comprise water, methanol ethanol and combinations thereof; other suitable diluents being identified below. According to the inventive method, diluents may be combined, such as aqueous DMF.

Ligands: Suitable ligands for MOF synthesis are known. In principle, any known ligand or any combinations of ligands suitable for a particular metal may be used for this step. Advantageously, ligands are selected from the group consisting of benzimidazole, 2-methyl imidazole, purine, 5-azabenz-imidazole, 4-azabenzimidazole, 5-chlorobenz-imidazole, imidazolate-2-carboxyaldehyde, 4-methyl-5-imidazole-carboxaldehyde, terephthalic acid, 1,3,5-benzene-tricarboxylic acid, muconic acid, benzene-1,3,5-tricarboxylic acid and combinations thereof. For example, excess of 2-methylimidazole may be used for synthesis of ZIF-8; other suitable ligands being identified below.

Additives: Suitable additives are known and depend on the reaction conditions for obtaining MOFs. Such additives may be selected to adjust the ph (acids, bases, buffer systems) or to adjust the ionic strength. For example, Ammonia (0-% wt), sodium hydroxide, sodium formate (saturated solution) may be used for synthesis of ZIF-8.

Suitable combinations of metal, ligand and solvent are indicated below:

| MOF | Metal Center | Ligand | Diluent |
|---|---|---|---|
| ZIF-7 | Zn | benzimidazole | DMF, EtOH, water |
| ZIF-8 | Zn | 2-methyl imidazole | methanol, water, EtOH |
| ZIF-20 | Zn | purine | DMF |
| ZIF-21 | Co | purine | DMF |
| ZIF-22 | Zn | 5-azabenzimidazole | DMF |
| ZIF-23 | Zn | 4-azabenzimidazole | DMF |
| ZIF-69 | Zn | 5-chlorobenzimidazole | DMF |
| ZIF-90 | Zn | imidazole-2-carboxyaldehyde | DMF, water, EtOH, i-PrOH, tert-BuOH, i-BuOH, |
| SIM-1 | Zn | 4-methyl-5-imidazolecarboxaldehyde | DMF |
| MIL-47 | V | terephthalic acid | water |
| MIL-53 (Al/Cr/Fe) | Al/Cr/Fe | 1,4-benzenedicarboxylic acid | water |
| MOF-5 | Zn | 1,4-benzenedicarboxylic acid | DMF |
| MIL-96 | Al | 1,3,5-benzenetricarboxylic acid | water |
| MIL-89 | Fe | muconic acid | EtOH, MeOH, water |
| MIL-101 | Cr | terephthalic acid | water |
| HKUST-1 | Cu | benzene-1,3,5-tricarboxylic acid | water, EtOH |

Accordingly, in an advantageous embodiment, the MOFs are selected from the group consisting of ZIF-7, ZIF-8, ZIF-20, ZIF-21, ZIF-22, ZIF-23, ZIF-69, ZIF-90, SIM-1, MIL-47, MIL-53, MOF-5, MIL-96, MIL-89, MIL-101, and HKUST-1; preferably ZIF-8.

Step (e), Post-treatment: Post-treatment steps are known per se and are entirely optional. One or more of the following steps may be performed in any suitable order.

Step (e1) In order to seal any potential pinholes between the polymer and the MOF-channels, a sealing step may be performed. Suitable solvent steaming parameters include 1-20 min at temperatures from 60-160° C. As a suitable solvent, the same solvent as used in dispersion may be used, either as pure solvent or in combination with a further solvent. It was found beneficial to apply such solvent steaming with dimethylacetamide when using polyethersulfone as polymer matrix.

In a second aspect, the invention relates to new composite materials (11), particularly in the form of a self-supporting membrane (1). These composites are obtainable according to the method described above, first aspect of the invention. This aspect of the invention shall be explained in further detail below:

In one embodiment, the invention provides for new composite materials (11), particularly for new membranes (1), obtainable according to the methods as described herein. The inventive membranes show advantageous properties. First, membranes (1) are flexible, self-supporting, non-continuous composites comprising a porous polymer structure and MOFs embedded in these structures. Second, the inventive membranes show, depending on the MOFs used, a high permeability and/or selectivity for fluids (liquids and gases). These properties shall be explained in further detail:

Selectivity: Typically, the MOFs (3) are embedded in these structures forming channels, particularly channels vertical to the membrane plane. Without being bound to theory, it is believed that the MOFs substantially improve the membrane's selectivity.

The selectivity of a membrane for the components of a given fluid may be assessed by considering Knudsen-diffusion. Assuming a simple pore, diffusion is dependent on pore radius and molecular mass. For example, the pair H2/CO2 has a value of 4.7 and the pair H2/propene has a value of 4.6. The inventive membranes show values way above the Knudsen limit, particularly a selectivity of H2/CO2 of 6.1 or more and/or a selectivity of H2/N2 of 8.9 or more. This finding indicates that the MOFs incorporated in the membrane significantly influence the selectivity of the inventive membranes. On the other hand, membranes showing a selectivity in the range of the Knudsen limit apparently possess simple channels that only provide moderate selectivity, i.e. a selectivity not influenced by molecular sieving.

Non-continuous: These composite materials (11) distinguish from those of the prior art, as the MOFs are not continuously distributed on the surface of a supporting material. Rather, the MOFs are incorporated in the channel-like structures. In the context of this invention, such distribution of MOFs is termed non-continuous.

Flexibility: The term is known in the field of membranes; the bending radius is linked to a material's flexibility and an accepted approach to assess flexibility. The bend radius, which is measured to the inside curvature, is the minimum radius a membrane can be deformed without kinking it, damaging it, or shortening its life. The smaller the bend radius, the greater is the material's flexibility. The inventive membranes show a bent radius of less than 10 mm, preferably less than 5 mm.

For commercial applications, membranes as described herein have to be integrated within suitable modules/devices. Spiral wound membrane modules have a relative high volume to membrane surface area ratio and therefore often are the housing of choice. However, whether a membrane is suitable for its application in a spiral wound membrane module depends on the membrane's mechanical flexibility. For the production of spiral wound membrane modules, the inventive membrane has to be wrapped around a permeate collector tube. A standard collector tube of an 1812 spiral wound membrane module (as for example a DOW FILMTEC™ BW60-1812-75 Element) has an outer diameter of 17 mm. During module production one or multiple membranes are rolled around this centered collector tube. In order to wrap the inventive membranes without damaging them around such a collector tube, a bend radius of at least 8.5 mm is required. Therefore, the flexibility of membranes is of high importance. These criteria are met by the membranes described herein.

Depending on the intended use, and on the manufacturing, the inventive composites (11) may be complemented by one or more layers (10, 12), thereby forming sandwiched structures (1), see FIGS. 1C, 1D, and 1E. These sandwiched structures retain the beneficial properties of the composite materials discussed above.

In one further embodiment, the MOFs (3) are embedded in the composite material as outlined herein and additionally comprise a layer (10) of MOFs on top of the composite material (11). The additional layer (10) may be considered as an inter-grown closed MOF film. Accordingly, the invention provides for a fourth composite material, particularly a membrane, containing a first layer (11) as outlined herein and a further layer (10) ("functional layer") as outlined herein, see FIG. 1E.

In one further embodiment, a second composite contains composite material (11) and an additional layer (12), said layer (12) ("supporting layer") as outlined herein, see FIG. 1C.

In one further embodiment, a third composite contains composite material (11) and an additional layer (12) on one side and an additional layer (10) on the opposite site, all layers as outlined herein, see FIG. 1D.

In one further embodiment, a fourth composite contains composite material (11) and an additional layer (10) as outlined herein, see FIG. 1E.

The composite material of this invention may be present in a large variety of shapes. The shape of the composite material mainly depends on its manufacturing, the starting materials used and on its intended use.

In one embodiment, the composite material is in the form of a membrane, typically a self-supporting membrane. The thickness may vary over a broad range, depending on the intended use, but typically within 10 to 500 µm. The area may vary over a broad range, such as 1 cm$^2$ to 10 m$^2$. In other embodiments, the composite material may be in the form of a tube, nested hollow tube, a honeycomb, slack of tubes.

In a third aspect, the invention relates to the use of composite materials, particularly membranes, as described herein. This aspect of the invention shall be explained in further detail below:

The composite materials, as described herein, have a wide range of commercial applications. Suitable applications mainly depend on the choice of MOF (3) and polymer matrix (2). The composite materials (11) as well as the second, third, and fourth composite material are particularly suitable for gas separation and solvent separation. Other applications include catalysis and sensing. Gas separation, such as separation H2/N2, H2/CO2 and propylene/propane are commercially important and difficult to achieve via membranes, as particularly small diameters of pores are required. As shown in the examples, the composite materials meet with this requirement. Solvents that can be separated include water, ethanol, propanol, butanol, pentane, hexane, cyclohexane. Further, the composite materials are particularly robust toward mechanical stress, making them a preferred choice under harsh commercial conditions. The inventive composite materials are particularly suited for separation of alkene/alkane streams (particularly C3H6/C3H8 streams); H2 purification or recovery; and/or alcohol (particularly ethanol) from aqueous compositions. These and further uses are discussed in detail below.

N2/H2 separation: Such separation is particularly relevant for hydrogen recovery in fuel cells; for hydrogen recovery from purge streams of classical refinery operation, gasification and biorefinery operation. A specific application is also in hydrogen recovery in fine chemical manufacturing, in hydrogenation units, where nitrogen purge gas is used to flush reactors before and after hydrogenation as a safety measure. The inventive membranes may also be used in the preparation of virtually oxygen free nitrogen as used in numerous technical applications as a protective atmosphere. There, an oxygen containing gas stream is contacted with an organic matter or hydrogen containing gas stream and optionally contacted with a catalyst (e.g. Platinum on alumina) and/or heated as to react oxygen with the reducing component (typically 200 to 500° C.). The remaining hydrogen is then removed through inventive membrane as to provide a virtually oxygen free nitrogen gas stream. The invention therefore also provides for the use of composite materials as described herein in the above described N2/H2 and N2/O2 separation methods.

In Ammonia manufacturing both for preparation of the corresponding reactor feed, and in operating the recycle streams after the ammonia stripping, it is important to correct the hydrogen/nitrogen ratio in the recycle stream. In local hydrogen manufacturing where many different local hydrogen gas sources typically yield a rather impure primary hydrogen stream, whilest applications demand a more pure hydrogen stream (e.g. fuel cells). A specific application is in local water electrolysis at small scale, where purge gas is present in the cell and only hydrogen is withdrawn, whilst purge gas is recycled in a closed loop. In local biomass gasification units where gram to kg amounts of biomass or other organic matter is heated to yield mixtures of various gases containing also nitrogen and hydrogen. That raw gas is of little use to further application unless purified using for example the here-in disclosed membranes or units containing such membranes. Another specific application is in transport systems driven by polymer fuel cells, that typically require high purity hydrogen streams, and where the hydrogen is prepared within the transport system through a known process and within limited space. A specific application is also in gas purge systems for the removal of dissolved excess hydrogen in continuously operated reactors requiring hydrogen, or yielding hydrogen as a by-product. Representative examples of such technical processes are the continuous dehydrogenation of ethyl-benzene to prepare styrene, or the hydrogenation of phenylacetylene to styrene. In the first case, hydrogen is removed from the styrene through stripping with nitrogen, and subsequently the nitrogen is passed through a membrane of the present invention before recycling. Similar, analogous examples can be found in numerous areas of petrochemical refining, fine chemical manufacturing, polymer manufacturing, and in bio-manufacturing applications. The invention therefore also provides for the use of composite materials as described herein in the above manufacturing methods.

Isotope enrichment: Another area of application is the preparation of gas isotopes, especially deuterium in a diffusion type reactor setup, where the inventive membrane serves as a mass-selective diffusive barrier for the hydrogen. The invention therefore also provides for the use of composite materials as described herein in the above methods for enrichment of isotopes.

alkene/alkane-separation: The separation of olefins (such as C2-C16 alkenes) from paraffins (such as C2-C16 alkanes) is considered an important technical process, e.g. for polymer chemistry and fuel production.

Separation of C3H6/C3H8: The preparation of high purity propylene is of tremendous technical importance in the manufacturing of polypropylene. The inventive membranes may be used at various process locations: The direct dehydrogenation of C3 streams yields mixtures of propane, propylene, and other decomposition products. A separation process involving the inventive membranes can typically be used to either up-concentrate a raw propylene stream from the cooled gas exiting the dehydrogenation unit, or to further purify a previously up-concentrated or pre-purified raw propylene stream. Here, combinations of inventive MOF and optionally Zeolite containing membranes can be used to separate propylene from propane, and hydrogen from the gas mixture, and optionally to yield CO rich streams that can separately be further processed. The invention therefore also provides for the use of composite materials as described herein in the above methods for synthesis and/or purification of propene. Separation of ethylene/ethane/propene/propane: Inventive membranes may be used in the replacement of energy intensive cryo-distillation of raw cracking product streams, or product streams from the conversion of methane into higher products. Stacked assemblies of the inventive membranes, optionally containing different microporous inorganic or hybrid organic/inorganic materials, may be used to provide single unit separators for complex gas mixtures. The invention therefore also provides for the use of composite materials as described herein in the above methods for the separation of C2/C3 gaseous mixtures. Separation of C4-fraction (butane/butenes/isobutene/isobutane): Inventive membranes may be used in the separation of C4 containing gas fractions either to separate for raw materials for further processing, or in the preparation of pure intermediates, or pure isomers. The invention therefore also provides for the use of composite materials as described herein in the above methods for separating components of the C4 fraction.

Carbon dioxide/nitrogen: The inventive membranes may be used to replace the current amine based CO2 scrubbing processes, typically based on a so called amine scrubber, most typically an ethanolamine or di-ethanol or tri-ethanolamine containing liquid binding CO2. Such CO2 up-concentration is broadly used in CO2 elimination from power plant off-gas, as a preparative step before injection of concentrated CO2 into underground or marine repositories, in the preparation of CO2 for further industrial processing, in the preparation of nitrogen for ammonia synthesis (decarbonation; here the use of an inventive membrane may replace the current methanation reactor process). The invention therefore also provides for the use of composite materials as described herein in the above methods for enrichment of carbon dioxide and/or the separation of CO2/N2 mixtures.

Hydrogen/carbon dioxide: Inventive membranes may be used to separate hydrogen from carbon dioxide. This industrially used process is at the core of gas preparation in numerous refining operations, in coal liquification, in several parts of Fischer-Tropsch synthesis, and associated downstream processes. Inventive membranes can also be used in the processing of gas streams as found in the preparation of hydrogen, typically when purifying syngas after the shift reaction. Inventive membranes thereby allow a reduction in unit size, rendering such gas processes more amenable to local, smaller size manufacturing, and miniaturization. Such miniaturized gas processing systems are of particular interest in the replacement of traditional battery systems, when a battery is replaced by a fuel cell and a local source of hydrogen gas. The invention therefore also provides for the use of composite materials as described herein in the above methods for separation of CO2/H2 mixtures.

Separation of ethanol/water mixtures: Inventive membranes may be used for a low cost, durable solution in the preparation of ethanol from raw ethanol/water mixtures as typically obtained in bio refineries. A separate range of applications is in the recycling of ethanol for the preparation of food and/or pharmaceutical extracts typically from microorganisms, plants, or animal parts. Here, large volume of ethanol are contacted with partially wet material, extract a desired compound or group of compounds, and is separated to isolate the target material. The resulting ethanol needs to be recycled and dried. The invention therefore also provides for the use of composite materials as described herein in the above methods for separating ethanol from aqueous compositions.

In all separation applications, it is understood that the inventive membrane components can be individually adapted as to best meet the specific parameters of the process, such as corrosion resistance, mechanical stability, gas flow rate, costs, metal content and others. It is further understood that the here described processes for preparation of the inventive membranes can also be done on compounds similar to the presently known microporous materials, but being modified in the specific type of chemically functional groups, backbone or middle component, number of connectivity, composition and metal content.

In a fourth aspect, the invention relates to devices comprising the composite materials, particularly membranes, as described herein. This aspect of the invention shall be explained in further detail below.

The invention provides in one embodiment for a filter, preferably a spiral wound membrane module or hollow fibre module. Such filters/membrane modules are useful for space efficient separation of gases. These membrane modules can provide the desired purity of specific gases, e.g. for feeding any type of gas requiring fuel cells.

The invention provides in one further embodiment for a reactor, such as an integrated water-gas-shift membrane reactor, comprising composite materials as described herein. Such reactors are useful where $H_2$ selective membranes are required to separate $H_2$, e.g. from a syngas stream.

The invention provides in one further embodiment for an electrochemical cell, coupled to a gas separation unit, where the composite materials, especially the here described membrane, is adapted to provide a hydrogen gas stream. Such cells are suitable for chemical conversion or intermediate storage and later use in a fuel cell, e.g. for electricity generation.

The invention provides in one further embodiment for an exit gas treatment system, e.g. as used to treat the outflow of a high temperature fuel cell, where remaining hydrogen is typically present in a smaller fraction (0.05 to 10 vol-% of the gas). The inventive materials can be used to separate part of the outflow's hydrogen as to further feed that recovered hydrogen into another fuel cell, or recycle the hydrogen into the feed stream of the fuel cell itself.

The invention provides in one further embodiment for an exit gas treatment system to remove hydrogen from gases (such as nitrogen, argon, carbon dioxide or hydrocarbons). Such systems are used to improve safety during further handling, or to further use the removed hydrogen for another purpose. The here described gas streams are often effluents of other processes where hydrogen is added as a reactant, or as part of a protection strategy (i.e. a reducing atmosphere), a product protection (i.e. in hot metal handling, soldering or melting), or accidentally, or is produced by the process, and ends up in a gas stream. Such situations occur when a process produced hydrogen as a by-product, or as part of locally unwanted conditions (e.g high temperature, or uneven reactant distribution, or partial product decomposition).

The invention provides in one further embodiment for portable and intermediate or large scale gas separation and purification modules. Such modules may be used for local supply of pure gases or specific gas mixtures either in stationary or in mobile applications. Since such modules can be manufactured very small (size of less than a millimeter) or very large (size of over ten meters), they may find application in local chemical sensing and energy transforming (e.g. electrochemical cells), chemical production, in hospitals, in food production, as energy sources, as energy storage components, in domestic energy related applications, in petrochemical applications and many others. In a specific embodiment, these modules can replace current gas supply systems by providing gases of similar purity (i.e. purity of the gas, or accuracy of the gas mixture) and at similar delivery rate (i.e. gas flow rate in terms of volume per time) by coupling local gas production, conversion or isolation with herein described composite materials, especially membranes. The gas flowing out of such module can then fulfill any purpose that has traditionally been served through gas delivery from pressurized gas cylinders.

The invention provides in one further embodiment for a electricity generating system, containing (a) an organic raw material conversion system working at elevated temperature and providing a mixture of numerous gases, containing some carbon monoxide, and/or some hydrogen, (b) an optional catalyst, that can increase the hydrogen content of the gas or otherwise improve the usability of such gas, (c) at least one, more than one composite material of the present invention, especially membranes, and (d) a fuel cell that is fed by the outflow of the module (c). Such system provides electricity and is particularly suited for local electricity generation.

The invention provides in one further embodiment for a local gas protection system, that removes hydrogen from a confined volume of gas. Such systems are adapted to avoid that gas from reaching dangerously high hydrogen levels. Such protection system consists of an area of the inventive composite material, where one side is exposed at least in one area to the confined gas, and the other side is exposed, at least in one area, to another gas, or air.

The invention provides in one further embodiment for a gas pressure relieve systems, where the composite materials of the present invention allow a gas to escape from one specific area into an adjacent area, or open air. Such systems are used either to reduce the pressure in that area (i.e. to avoid mechanical damage, or unwanted reactions), or to maintain specific gas process parameters of that area in a suitable range.

To further illustrate the invention, the following examples are provided. These examples are provided with no intend to limit the scope of the invention.

I. Membrane Preparation

Step (a): Preparation of Dispersion: Polyethersulfone (PES, Veradec, A-201) 10 wt. % was dissolved in dimethylacetamide (DMAc), then mixed with either ZnO-nanoparticles (Zincox 10, IBUtec) or $Na_2CO_3$ and glycerol (Sigma-Aldrich, 99.5%). The particles were dispersed using an ultrasonic processor.

Step (b) Coating: A spiral film applicator (Zehntner, ZAA2300, 180 µm pitch bar) was used for producing $Na_2CO_3$ containing films of A4 size. After the films were dried in an oven at 120° C. for 10 min, they were coated with a second, ZnO containing dispersion. The film was dried at 120° C. for 10 min.

The $Na_2CO_3$ particles and additives were extracted by incubating the film in a DI water bath for 5 min followed by drying.

Step (c) ZIF-8 Growth & Membrane Sealing Step: The ZnO containing membrane (3) was incubated in 18 ml solution 1 (containing 132.7 g MeOH, 57 g DMAc, 15.6 g 2-methylimidazole, 8.6 g sodium formate) at 120° C. for 10 min, followed by washing three times in MeOH over 5 hours. The membrane was dried in an oven for 5 hours at 60° C.

Step (d): Finally the membrane was incubated in solution 2 (water: 200 g, 2-methylimidazole: 22.7 g) at 100° C. for 30 min followed by repeated washing three times in MeOH over 5 hours and drying in an oven for 5 hours at 60° C.

Step (e), post treatment: DMAc steaming was executed in an exicator (preheated to 100° C.) for 5 minutes at 100° C. In order to selectively steam the ZIF-8 containing membrane side and protect the supporting layer from the solvent steam, the membrane was taped onto a polypropylene ring fitting into the exicator and containing a hole. The ZIF-8 containing side was facing the ground of the desiccator and was exposed to a DMAc-Air atmosphere. The upper compartment (where the supporting side was facing to) was opened, minimizing the DMAc vapor on that side. After a incubating the ZIF-8 containing membrane in a DMAc atmosphere, remaining pinholes could be eliminated (FIG. 3 (5))

II. Membrane Analysis

XRD: For characterizing the ZIF-8 and ZnO containing polymer membrane, X-ray diffraction (XRD) measurements were conducted. In FIG. 2, XRD patterns of the final membrane (iii) were compared to measurements of ZIF-8 (i) and ZnO powders only (ii). As the data clearly show, the inventive membrane contains ZIF-8 in addition to ZnO. SEM: The SEM image shown in FIG. 3 (5), illustrate the well embedded crystals within the membrane after steaming.

III. Membrane Performance

Gas Flux: In order to measure the membrane intactness after mechanical membrane bending, gas flux rates of freshly synthesized ZIF-8 composite membranes were compared to the ones of bent membranes. Therefore, before measuring the gas flux, a set of membranes was bent around a metal bar with a diameter of 5 mm. Gas flux rates of bent and unbent membranes were compared (I1-3: unbent, B1-2: bent).

| | Gas Flux [mol m$^{-2}$ s$^{-1}$ Pa$^{-1}$] | | | Sectivity | |
|---|---|---|---|---|---|
| Sample | H2 | CO2 | N2 | H2/CO2 | H2/N2 |
| unbent | | | | | |
| I1 | 3.0E−7 | 0.22E−7 | 0.21E−7 | 13.5 | 14.2 |
| I2 | 1.2E−7 | 0.20E−7 | 0.13E−7 | 6.1 | 9.2 |
| I3 | 7.5E−7 | 0.89E−7 | 0.67E−7 | 8.4 | 11.2 |
| bent | | | | | |
| B1 | 14E−7 | 1.5E−7 | 1.6E−7 | 9.6 | 8.9 |
| B2 | 1.8E−7 | 0.18E−7 | 0.01E−7 | 10.0 | 18.6 |

As can be seen, a high selectivity for hydrogen is observed for the initially manufactured membranes. This selectivity is maintained, even after exposure to mechanical stress (bending on a bar of 5 mm diameter). These data show the superior mechanical properties of the inventive composites.

IV. Comparative Example, US2015/0367294, Ex. 8

PSF Membrane fabrication: Polysulfone (PSF, Sigma-Aldrich, Lot #MKBG7821V, 8 wt. %) was dissolved in N,N-dimethylacetamide (DMAc, abcr; 99%, lot 1351129, 71 wt. %) and mixed with glycerol (Sigma-Aldrich, 99.5%, 3 wt. %) and zinc oxide (ZnO) nanoparticles (Zincox 10, IBUtec, 18 wt. %). The dispersion was cast on a glass plate using a spiral bar (120 μm pitch) and dried in an oven at 110° C. for 10 min. The glycerol and ZnO nanoparticles were removed from the PSF matrix by incubating the membrane in 1 M HCl bath for 10 min.

ZIF-8/PSF membrane synthesis: The ZIF-8/PSF composite membranes were synthesized as described in US2015/0367294 A1, Example 8 (ZIF8-60D, ZIF8-RTD).

Membrane bending: In order to test the membrane's ideal selectivity after mechanical bending, the membranes were bent around a round steel bar of 5 mm in diameter, before repeated gas permeation measurement.

SEM analysis: An FEI nova NanoSEM 450 was used at 3 kV and spot-size 2.5. The samples were coated with 3 nm of platinum (Leica EAA, SCD005). For analyzing cross sections, the membranes were broken after cooling them with liquid nitrogen.

Gas permeation measurements: An in-house built permeation testing cell and a manual bubble flow meter (Sigma-Aldrich) were used for the single gas permeation measurements of $H_2/CO_2$ and $C_3H_6$ at 1 bar and RT.

Results: The materials obtained (samples of the group ZIF-8/PSF RT and ZIF-8/PSF 60° C.) were measured unbent and bent. Three samples per condition (RT/60° C.) were fabricated and their single gas flux rates were measured. The values in the table below correspond to the average value of the measurements. One membrane of the RT group broke during measurement, therefore the values marked with an asterisk (*) correspond to average of two values.

As can be seen, the membranes obtained according to the prior art show low selectivity for hydrogen. The values are significantly below the selectivity obtained when using the inventive membranes, see III above.

Moreover, the values observed are below the selectivity expected according to Knudsen-diffusion. Further, bending seemingly not influences selectivity. These findings imply that the MOFs incorporated in these membranes according to the protocol of US2015/0367294 have little, if any, effect on the selectivity of the membrane.

TABLE 1

Gas permeance values and ideal selectivity of "unbent" ZIF-8/PSF membranes fabricated according to US2015/0367294 A1.

| | Permeance (mol s$^{-1}$ m$^{-2}$ Pa$^{-1}$) | | | Selectivity | |
|---|---|---|---|---|---|
| | $H_2$ | $CO_2$ | $C_3H_6$ | $H_2/CO_2$ | $H_2/C_3H_6$ |
| ZIF-8/PSF RT, unbent | 5.7 × 10$^{-6}$ * | 2.1 × 10$^{-6}$ * | 2.0 × 10$^{-6}$ * | 3.4 * | 4.4 * |
| ZIF-8/PSF 60° C., unbent | 1.9 × 10$^{-6}$ | 6.1 × 10$^{-7}$ | 5.3 × 10$^{-7}$ | 2.9 | 3.6 |
| Knudsen Selectivity | | | | 4.7 | 4.6 | n = 3;
* two of three samples could be measured, as one cracked during measurement.

TABLE 2

Gas permeance values of ZIF-8/PSF "bent" membranes fabricated according to US2015/0367294 A1.

| | Permeance (mol s$^{-1}$ m$^{-2}$ Pa$^{-1}$) | | | Selectivity | |
|---|---|---|---|---|---|
| | $H_2$ | $CO_2$ | $C_3H_6$ | $H_2/CO_2$ | $H_2/C_3H_6$ |
| ZIF-8/PSF RT, bent | 5.6 × 10$^{-6}$ * | 1.7 × 10$^{-6}$ * | 1.7 × 10$^{-6}$ * | 3.6 * | 4.0 * |
| ZIF-8/PSF 60° C., bent | 3.1 × 10$^{-6}$ | 8.5 × 10$^{-7}$ | 6.8 × 10$^{-7}$ | 3.7 | 4.6 |
| Knudsen Selectivity | | | | 4.7 | 4.6 |

* two of three samples could be measured, as one cracked during measurement.

The invention claimed is:

1. A method for manufacturing a composite material (11), said composite material (11) comprising a polymer matrix (2) and metal-organic frameworks (MOFs) (3), said MOFs (3) being embedded in said polymer matrix (2) in channel-like structures (4);
said method comprising the step of:
(a) providing a dispersion (5) consisting of a dispersed phase (51) and continuous phase (52)
said dispersed phase (51) comprising nanoparticles selected from the group consisting of metals, metal oxides, metal salts, and metal silicates;
said continuous phase (52) comprising a polymer, a first solvent and a second solvent;
(b) coating a substrate (6) with said dispersion (5);
(c) subjecting the obtained material to a phase inversion step by removing said first solvent to thereby obtain a precursor material (13);
(d) contacting the obtained precursor material (13) with a solution (7) comprising
a solvent selected from the group consisting of water, C1-C8 mono-alcohols optionally in combination with water, dimethylacetamide in combination with water or methanol;
a ligand selected from the group consisting of benzimidazole, 2-methyl imidazole, imidazolate-2-carboxyaldehyde;
(e) optionally removing the obtained composite material (11) from said substrate (6) and/or further processing the obtained composite material (11).

2. The method according to claim 1, wherein said composite material (11) is a membrane.

3. The method according to claim 1, wherein in said dispersion (5) the nanoparticle:polymer ratio ranges from 30:70 to 80:20 (by weight).

4. The method according to claim 1, wherein in said solution (7) the ligand:solvent ratio ranges from 0.1:99.9 to 20:80, preferably from 1:99 to 20:80 (by weight).

5. The method according to claim 1, wherein said step (b) a film from 10 μm to 500 μm is casted.

6. The method according to claim 1, wherein said step (c) is carried out at temperatures from 60° C. to 200° C.

7. The method according to claim 1, wherein said step (d) is performed at temperatures from 10° C. to 100° C. and optionally is divided in different temperature steps from 1 min to 360 min.

8. The method according to claim 1, wherein said step (e) is one of a post-synthesis step performed at temperatures from 10° C. to 100° C. and optionally is divided in different temperature steps from 1 min to 360 min, a post solvent steaming step, and a combination thereof.

9. A self-supporting membrane, obtained by performing steps (a) to (e) according to claim 1.

10. The method according to claim 2, wherein in said dispersion (5) the nanoparticle:polymer ratio ranges from 30:70 to 80:20 (by weight).

11. The method according to claim 2, wherein in said solution (7) the ligand:solvent ratio ranges from 0.1:99.9 to 20:80, preferably from 1:99 to 20:80 (by weight).

12. The method according to claim 2, wherein said step (b) a film from 10 μm to 500 μm is casted.

13. The method according to claim 2, wherein said step (c) is carried out at temperatures from 60° C. to 200° C.

14. The method according to claim 2, wherein said step (d) is performed at temperatures from 10° C. to 100° C. and optionally is divided in different temperature steps from 1 min to 360 min.

15. The method according to claim 2, wherein said step (e) is one of a post-synthesis step performed at temperatures from 10° C. to 100° C. and optionally is divided in different temperature steps from 1 min to 360 min, a post solvent steaming step and a combination thereof.

16. The method according to claim 1, wherein said composite material (11) is a flexible, self-supporting, non-continuous membrane.

* * * * *